(12) United States Patent
Ishitobi et al.

(10) Patent No.: US 9,352,710 B2
(45) Date of Patent: May 31, 2016

(54) ANTI-COLLISION COMPONENT

(71) Applicants: Kobe Steel, Ltd., Kobe-shi (JP);
DAIDO KOGYO CO., LTD., Kaga-shi (JP)

(72) Inventors: Hideki Ishitobi, Nagoya (JP); Narikazu Hashimoto, Shimonoseki (JP); Tsunetake Tsuyoshi, Shimonoseki (JP); Shingo Shimoaka, Shimonoseki (JP); Tomomichi Ohtani, Kaga (JP); Kenji Nakaya, Kaga (JP); Kei Chino, Kaga (JP)

(73) Assignees: Kobe Steel, Ltd., Kobe-shi (JP); DAIDO KOGYO CO., LTD., Kaga-shi (JP)

( * ) Notice: Subject to any disclaimer, the term of this patent is extended or adjusted under 35 U.S.C. 154(b) by 0 days.

(21) Appl. No.: 14/887,701

(22) Filed: Oct. 20, 2015

(65) Prior Publication Data
US 2016/0114747 A1    Apr. 28, 2016

(30) Foreign Application Priority Data
Oct. 22, 2014 (JP) ................. 2014-215429

(51) Int. Cl.
*B60R 19/18* (2006.01)
*B60R 19/03* (2006.01)

(52) U.S. Cl.
CPC ............. *B60R 19/18* (2013.01); *B60R 19/03* (2013.01); *B60R 2019/186* (2013.01)

(58) Field of Classification Search
CPC ................. B60R 19/18; B60R 19/03

USPC ........ 296/146.6, 210; 293/102, 120, 122, 118
See application file for complete search history.

(56) References Cited

U.S. PATENT DOCUMENTS

| 6,182,994 B1 | 2/2001 | Gogo et al. | |
| 6,219,919 B1 | 4/2001 | Gogo et al. | |
| 7,648,191 B2 * | 1/2010 | Sakamoto | B60J 5/0444 |
| | | | 29/897.2 |
| 2005/0225115 A1* | 10/2005 | Wallstrom | B60J 5/0426 |
| | | | 296/146.6 |

FOREIGN PATENT DOCUMENTS

| JP | 07-025296 | 1/1995 |
| JP | 09-058386 | 3/1997 |
| JP | 10-094844 | 4/1998 |

(Continued)

*Primary Examiner* — Joseph D Pape
(74) *Attorney, Agent, or Firm* — Oblon, McClelland, Maier & Neustadt, L.L.P.

(57) ABSTRACT

An anti-collision component consisting of a metal hollow profile for automobiles includes a collision side flange, a body side flange, and a web connected to the flanges. The hollow profile has a longitudinal end at which a cross-sectional configuration is deformed by swaging to reduce a dimension between the flanges. The following relations are established:

$$t_W > T_W$$

$$R_{CI} \geq (t_W - T_W)$$

where $t_W$ is a wall thickness of the web at the end, $T_W$ is a wall thickness of the web at a portion where the cross-sectional configuration is not deformed, and $R_{CI}$ is an inside corner radius of a corner formed of the web and each flange at the portion.

5 Claims, 7 Drawing Sheets

(56) References Cited

FOREIGN PATENT DOCUMENTS

| JP | 3023657 | 3/2000 |
| JP | 2004-025214 | 1/2004 |
| JP | 2006-151095 | 6/2006 |
| JP | 2010-036746 | 2/2010 |
| JP | 2013-147189 | 8/2013 |

* cited by examiner

Fig.6a  Fig.6b  Fig.6c
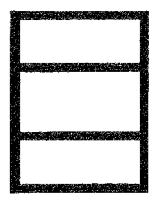 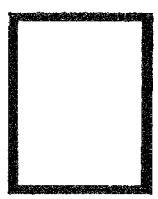 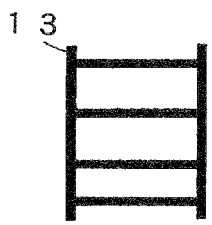
Fig.6d  Fig.6e
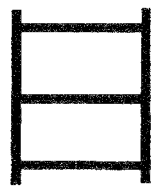 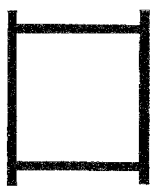
Fig.7
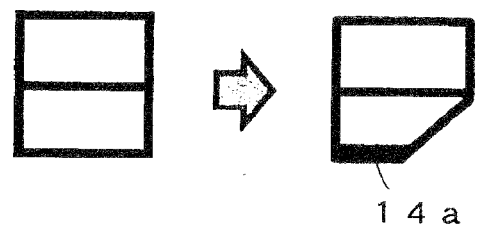
Fig.8
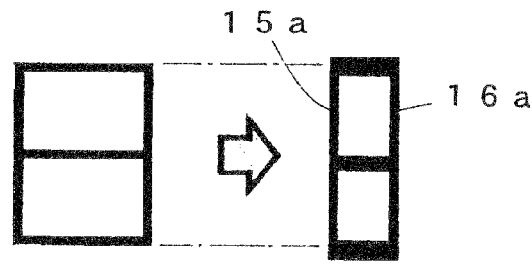

ANTI-COLLISION COMPONENT

CROSS-REFERENCE TO RELATED APPLICATIONS

This application claims priority of Japanese Patent Application No.: 2014-215429 filed on Oct. 22, 2015, the content of which is incorporated herein by reference.

BACKGROUND OF THE INVENTION

The present invention relates to an anti-collision component for automobiles, such as a bumper reinforcement, a door impact beam, a roof reinforcement, an FUP (front underrun protector) for a truck, and an RUP (rear underrun protector) for a truck.

RELATED ART

With the recent enforcement of the automobile collision standards, mounted are anti-collision components, such as a bumper reinforcement, a door impact beam, a roof reinforcement, an FUP, and an RUP, which are members against a front or rear collision with a small overlap amount (also called offset barrier collision or small lap collision), an oblique collision (also called end pendulum collision), and a side collision (also called side impact).

These anti-collision components are required to reduce outer shape dimensions of longitudinal ends thereof. More specifically, the bumper reinforcement such as FUP or RUP is required to reduce the body front-rear dimension (L dimension) of each longitudinal end thereof for operability improvement by reducing the smallest turning radius of an automobile and for design requirements. The door impact beam is required to reduce the body widthwise dimension (W dimension) of the longitudinal end thereof e.g. for mounting on an inner panel of a door or for design requirements. The roof reinforcement is required to reduce the body heightwise dimension (H dimension) of the longitudinal end thereof for mounting on a roof side rail or for design requirements.

Because mounted at positions far from the center of gravity of the automobile, the anti-collision components greatly affect moment of inertia. The anti-collision components are thus required to be reduced in weight, for improving, not only fuel efficiency, but also motion performance, and are made of aluminum extrusions.

JP H07-025296 A discloses a bumper reinforcement in which each end of an aluminum extrusion is squeezed to reduce the L dimension of the cross section thereof. JP 2006-151095 A discloses a bumper reinforcement in which each end of an aluminum extrusion is obliquely cut off to reduce the L dimension of the cross section thereof, and a groove-shaped reinforcing member is provided to the obliquely cut-off portion from the front side. JP H09-58386 A discloses a door beam in which each end of an aluminum extrusion is squeezed to reduce the W dimension of the cross section thereof. JP H10-94844 A (FIG. 8) discloses a door beam in which each end of an aluminum extrusion is obliquely cut off to reduce the W dimension of the cross section thereof. JP 2010-36746 A (paragraph 0019) discloses a roof reinforcement in which each end of an aluminum extrusion is squeezed or obliquely cut off to reduce the H dimension of the cross section thereof.

SUMMARY

The anti-collision component such as the bumper reinforcement is required to reduce the outer shape dimension of each longitudinal end thereof and to have high deformation strength. However, in the bumper reinforcement made of, for example, the aluminum extrusion, when the longitudinal end is squeezed to reduce the L dimension of the cross section thereof, the deformation load in collision is reduced because the webs are bent (see JP H07-025296 A). Consequently, in a front collision with a small overlap amount, a collision article intrudes into the body to increase damage to the body. In addition, to increase the deformation load in collision, a different member can be mounted to increase the strength of the end (see JP 2006-151095 A), but the increase in the number of components and the number of welding steps causes higher cost.

When the end of the door beam is squeezed or is obliquely cut to reduce the W dimension of the cross section, or when the end of the roof reinforcement is squeezed or is obliquely cut to reduce the H dimension of the cross section, the strength of the end is degraded. When a reinforcing component such as a bracket is made larger in order to compensate for the strength degradation, the cost and weight are increased.

An object of the present invention is, in a anti-collision component such as a bumper reinforcement with a reduced outer shape dimension at an longitudinal end thereof, preventing strength degradation of the end, and thereby preventing degradation in collision resistant performance without using a different component.

The present invention provides an anti-collision component having a unibody construction includes a metal hollow profile that has a collision side flange, a body side flange, and a web connected to the flanges. The hollow profile has a longitudinal end at which a cross-sectional configuration is deformed. The following relations are established:

$$t_W > T_W$$

$$R_{CI} \geq (t_W - T_W)$$

where $t_W$ is a wall thickness of the web at the end, $T_W$ is a wall thickness of the web at a portion where the cross-sectional configuration is not deformed, and $R_{CI}$ is an inside corner radius of a corner formed of the web and each flange at the portion. The profile is an elongated material with substantially same cross-sectional configuration in a longitudinal direction.

The anti-collision component for automobiles includes specific embodiments as follows.
(1) The hollow profile has a pair of webs parallel to each other, the pair of webs being connected to the flanges.
(2) the hollow profile has an intermediate web parallel to the pair of webs in the cross section thereof, and
wherein the following relation is established:

$$R_1 \geq (t_1 - T_1)$$

where $t_1$ is a wall thickness of the intermediate web at the end, $T_1$ is a wall thickness of the intermediate web at the portion where the cross-sectional configuration is not deformed, and $R_1$ is a fillet radius of each of connecting portions of the intermediate web and each flange at the portion where the cross-sectional configuration is not deformed.
(3) The hollow profile is an aluminum alloy extrusion.
(4) The hollow profile is made by roll forming of a steel plate.

In the anti-collision component according to the present invention, the longitudinal end of the metal hollow profile is swaged to reduce the dimension between the flanges at the end (or to shorten the length of the web), and wall thickness $t_W$ of the web at the end is made larger than initial wall thickness $T_W$ (before swaging) ($t_W > T_W$). This can improve the designability and operability of an automobile with the anti-collision component, prevent the strength degradation of the longitudinal end of the anti-collision component without using a different component, and prevent degradation in the collision resistant performance.

In the anti-collision component according to the present invention, an inside corner radius (initial corner radius) $R_{CI}$ of the corner formed by the web and the flange is equal to or larger than the difference between the wall thicknesses before and after the swaging of the web at the end ($t_W - T_W$) ($R_{CI} \geq (t_W - T_W)$). In addition, a fillet radius of the connecting portion of the intermediate web and the flange (initial fillet radius) $R_I$ is equal to or larger than the difference between the wall thicknesses before and after the swaging of the intermediate web at the end ($R_I \geq (t_I - T_I)$). This allows the material to be smoothly flowed in the corner or the connecting portion at swaging, so that the web and the intermediate web after swaging are connected to the flanges along the entire thicknesses thereof. As a result, a crack or the like in collision is prevented at the end after swaging to improve the collision resistant performance.

BRIEF DESCRIPTION OF THE DRAWINGS

The foregoing and the other features of the present invention will become apparent from the following description and drawings of an illustrative embodiment of the invention in which:

FIGS. 6a to 6e are diagrams showing other example of a cross-sectional configuration of the metal hollow profile according to the present invention;

FIG. 7 is a cross-sectional view showing the metal hollow profile according to the present invention before and after swaging;

FIG. 8 is a cross-sectional view showing other metal hollow profile according to the present invention before and after swaging;

DETAILED DESCRIPTION OF EMBODIMENTS

An anti-collision component for automobiles according to the present invention will be specifically described with reference to FIGS. 1 to 8.

Figure 1:
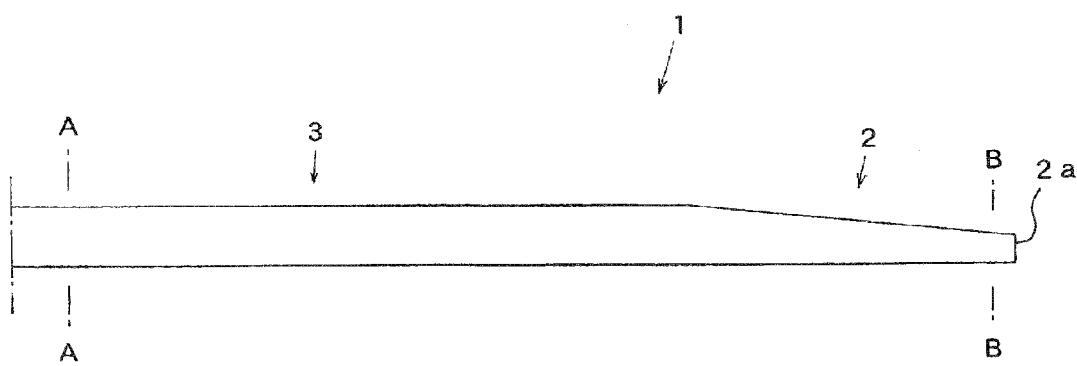
FIG. 1 is a plane view of a bumper reinforce made of an aluminum alloy extrusion which is subject to swaging (before bending)
Figure 2:
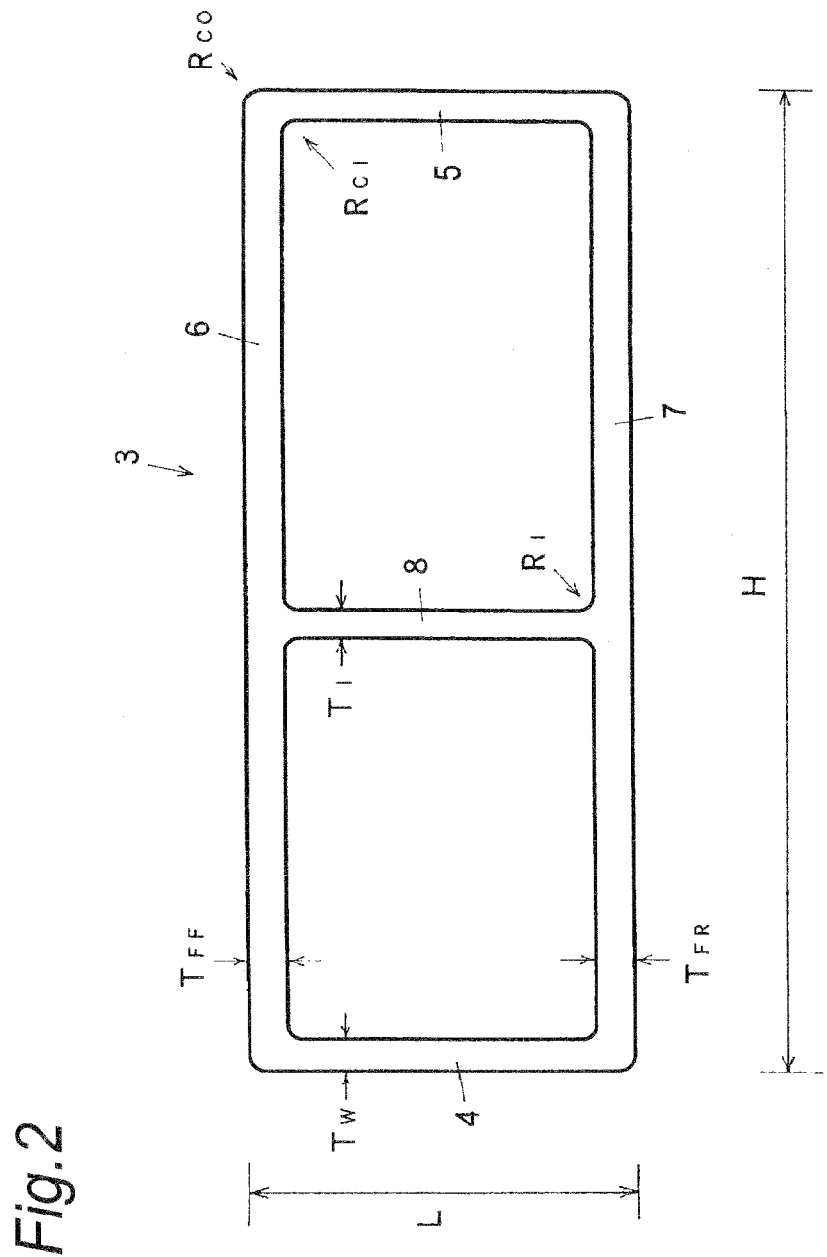
FIG. 2 is a cross-sectional view taken along a line A-A of FIG. 1.
Figure 3:
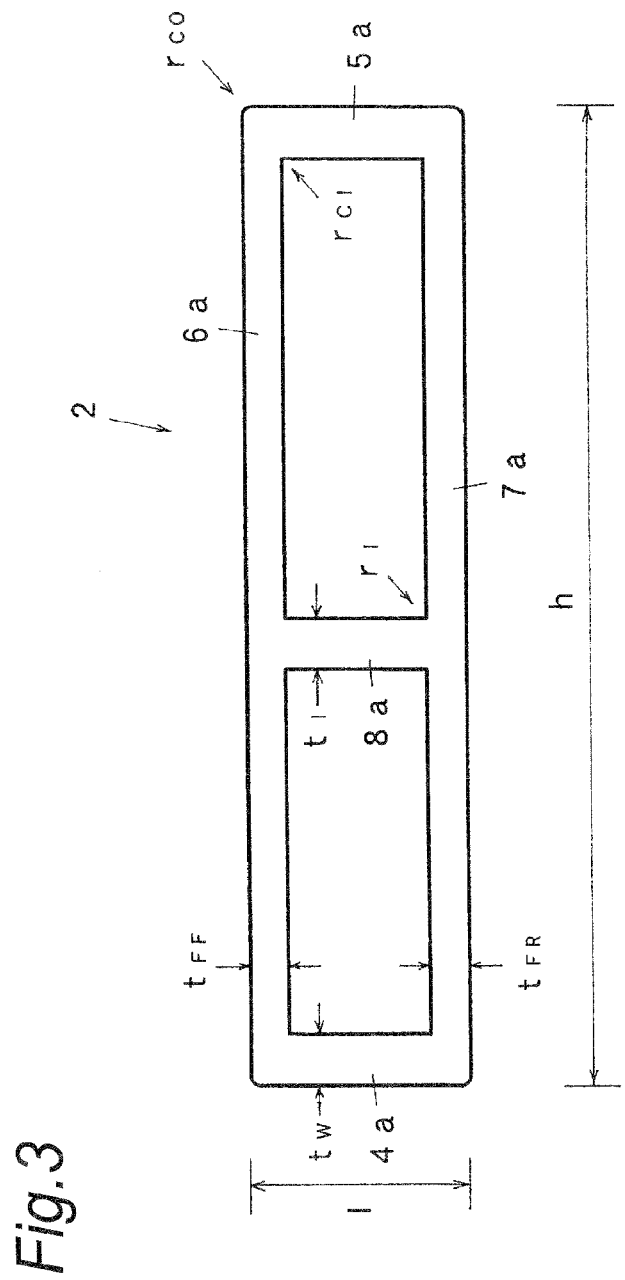
FIG. 3 is a cross-sectional view taken along a line B-B of FIG. 2.

As a specific example of the anti-collision component for automobiles according to the present invention, FIGS. 1 to 3 illustrate the right half of a bumper reinforcement 1 made of an aluminum alloy extrusion (before bending). The bumper reinforcement 1 has an end 2 swaged for deforming the cross-sectional configuration of the aluminum alloy extrusion (or inclined on the collision face side), and a center portion 3 maintain the initial cross-sectional configuration of the aluminum alloy extrusion.

As illustrated in the cross-sectional view of FIG. 2, the center portion 3 of the bumper reinforcement 1 (or the initial aluminum alloy extrusion) has a square cross section perpendicular to the extrusion direction, and has webs 4, 5 parallel to the collision load direction supposed (in the horizontal plane), a collision side flange 6 and a body side flange 7 connected to the webs 4, 5, and an intermediate web 8. The collision side flange 6 and the body side flange 7 are parallel to each other, and are perpendicular to the webs 4, 5. The intermediate web 8 is in the cross section, parallel to the webs 4, 5, and connected perpendicularly to the flanges 6, 7.

In the cross-sectional configuration illustrated in FIG. 2, a reference sign L denotes a body front-rear dimension of the cross section, a reference sign H denotes a body heightwise dimension of the cross section, a reference sign $T_W$ denotes the wall thickness of each of the webs 4, 5, a reference sign $T_I$ denotes the wall thickness of the intermediate web 8, a reference sign $T_{FF}$ denotes a wall thickness of the collision side flange 6, and a reference sign $T_{FR}$ denotes a wall thickness of the body side flange 7. Further, a reference sign $R_{CI}$ denotes an inside corner radius of each of corners formed by the webs 4, 5 and the flanges 6, 7, a reference sign $R_{CO}$ denotes the outside corner radius of the corner, and a reference sign $R_I$ denotes the fillet radius of each of connecting portions of the intermediate web 8 and the flanges 6, 7. The wall thicknesses of the webs 4, 5 are not required to be the same, and the wall thicknesses of the collision side flange 6 and the body side flange 7 are not required to be the same. In addition, the inside corner radiuses of the four corners are not required to be the same, the outside corner radiuses of the four corners are not required to be the same, and the fillet radiuses of the four connecting portions are not required to be the same.

As illustrated in the cross-sectional view in FIG. 3, the end 2 of the bumper reinforcement 1 has a square cross section, and has webs 4a, 5a parallel to the collision load direction supposed, a collision side flange 6a and a body side flange 7a connected to the webs 4a, 5a, and an intermediate web 8a. The collision side flange 6a and the body side flange 7a are perpendicular to the webs 4a, 5a. The intermediate web 8a is in the cross section, is parallel to the webs 4a, 5a, and is connected perpendicularly to the flanges 6a, 7a. It should be noted that, to distinguish the end 2 from the center portion 3 or each portion of the cross section of the initial aluminum alloy extrusion, "a" is provided after the number of the each portion of the cross section of the end 2.

In the cross-sectional configuration illustrated in FIG. 3, 1 is the body front-rear dimension of the cross section, a reference sign h denotes the body heightwise dimension of the cross section, a reference sign $t_W$ denotes a wall thickness of each of the webs 4a, 5a, a reference sign $t_{FF}$ denotes a wall thickness of the collision side flange 6a, a reference sign $t_{FR}$ denotes a wall thickness of the body side flange 7a, and a reference sign $t_I$ denotes a wall thickness of the intermediate web 8a. Further, a reference sign $r_{CI}$ denotes an inside corner radius of each of corners formed by the webs 4a, 5a and the flanges 6a, 7a, a reference sign $r_{CO}$ denotes an outside corner radius of the corner, and a reference sing $r_I$ denotes a fillet radius of each of connecting portions of the intermediate web $8a$ and the flanges $6a$, $7a$.

In the bumper reinforcement 1, by swaging, the collision side flange 6a of the end 2 is inclined from the extrusion direction, and the body front-rear dimension 1 is entirely smaller than the initial dimension L. The dimension between the flanges 6a, 7a of the end 2 is smaller than the initial dimension (the dimension between the flanges 6, 7) and is getting smaller toward the edge. In other words, the body front-rear length of each of the webs 4a, 5a and the intermediate web 8a is getting shorter toward the edge. In addition, the wall thickness $t_W$ of each of the webs 4a, 5a and the wall thickness $t_I$ of the intermediate web 8 are larger than the initial wall thicknesses $T_W$, $T_I$ ($t_W > T_W$, $t_I > T_I$), and are getting larger toward a tip end of the end portion 2.

Such swaging can be performed by the methods disclosed in JP No. 3023657 B or JP 2004-25214 A, for example. By changing the mandrel and the processing amount at swaging, a contour of the end 2 (front-rear dimension 1, and body heightwise dimension h) and the wall thickness of each of the webs 4a, 5a and the intermediate web 8a can be variously adjusted.

To preferably perform swaging, in the initial aluminum alloy extrusion, the inside corner radius $R_{CI}$ of the corner is set to be equal to or larger than the difference between the wall thickness $t_W$ of each of the webs 4a, 5a after swaging and the wall thickness $T_W$ of each of the initial webs 4, 5 ($t_W - T_W$) ($R_{CI} \geq (t_W - T_W)$). Especially, this relation is established for the wall thickness $t_W$ at a portion 2a which is the most tip end side of the end 2. In addition, the fillet radius $R_I$ of the connecting portion is set to be equal to or larger than the difference between the wall thickness $t_I$ of the intermediate web 8a after swaging and the wall thickness $T_I$ of the initial intermediate web 8 ($t_I - T_I$) ($R_I \geq (t_I - T_I)$). Especially, this relation is established for the wall thickness $t_I$ at the portion 2a which is the most tip end side of the end 2.

Figure 4:
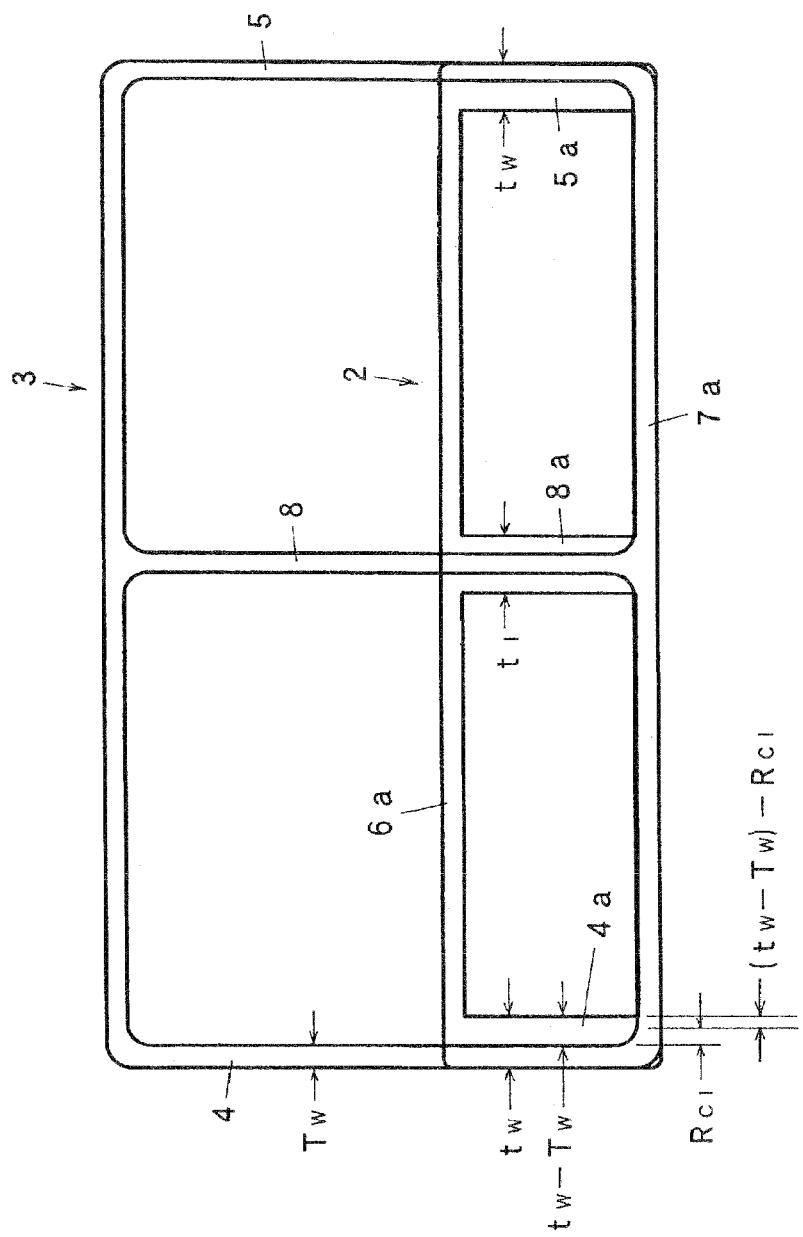
FIG. 4 is a diagram for explaining a reason for an inside corner radius $R_{CI}$ set so as to be not smaller than a difference between thicknesses of a web before and after swaging ($t_w - T_w$), i.e., so that ($R_{CI} \geq (t_W - T_W)$) is satisfied.

FIG. 4 illustrates the cross section of the end 2 after swaging overlapped with the initial cross section (before swaging). In this example, as indicated by arrows in FIG. 4, the inside corner radius $R_{CI}$ of each corner is set to be smaller than the difference between wall thickness $t_W$ of the web 4a after swaging and wall thickness $T_W$ of the initial web 4 (before swaging) ($t_W - T_W$) ($R_{CI} < (t_W - T_W)$). In this case, within a range of (($t_W - T_W) - R_{CI}$) of the corner, the material is hard to be smoothly flowed at swaging, that is, a crack is caused between the web 4a and each of the flanges 6a, 7a within the range. From this position, a crack is likely to be caused in collision, thus degrading the collision resistance performance. In this example, the same thing is caused in the web 5a.

To connect the web 4a and the intermediate web 8a after swaging to each of the flanges 6a, 7a along the entire thicknesses thereof ($t_W$, $t_I$) (to avoid the state where a crack is caused), it is necessary to satisfy the relation equations ($R_{CI} \geq (t_W - T_W)$, $R_I \geq (t_I - T_I)$).

By swaging, the inside corner radius $r_{CI}$ of each of the corners formed by the webs 4a, 5a and the flanges 6a, 7a is smaller than the initial inside corner radius $R_{CI}$ (before swaging). When the initial inside corner radius $R_{CI}$ is smaller than 1 mm, the material is hard to be smoothly flowed in the corner at swaging, and the phenomenon described with reference to FIG. 4 can be caused. Therefore, preferably, the initial inside corner radius $R_{CI}$ satisfies the above relation ($R_{CI} \geq (t_W - T_W)$), and is 1 mm or more. More preferably, the initial inside corner radius $R_{CI}$ is 2 mm or more.

The fillet radius $r_I$ of each of the connecting portions of the intermediate web 8a and the flanges 6a, 7a is smaller than an initial fillet radius $R_I$ (before swaging). When the initial fillet radius $R_I$ is smaller than 1 mm, the material is hard to be smoothly flowed in the connecting portion at swaging, and the phenomenon described with reference to FIG. 4 can be caused. Therefore, preferably, the initial fillet radius $R_1$ satisfies the above relation ($R_I \geq (t_I - T_I)$), and is 1 mm or more. More preferably, the initial fillet radius $R_I$ is 1.5 mm or more.

In the bumper reinforcement 1, the initial outside corner radius $R_{CO}$ of each of the corners formed by the webs 4, 5 and the flanges 6, 7 is preferably 1 mm or more. When the outside corner radius $R_{CO}$ is smaller than 1 mm, the local stress caused in a die at swaging is increased, thus significantly degrading the life of the die. When the bumper reinforcement 1 is made of a high strength material, damage to the die is particularly significant. Thus, the initial outside corner radius $R_{CO}$ is preferably 1 mm or more, and more preferably, is 2 mm or more.

In the bumper reinforcement 1, the thickened webs 4a, 5a and intermediate web 8a prevent the strength degradation of the end 2. Thus, in a front or rear collision with a small overlap amount or an oblique collision, the amount of intrusion of a collision article into the body can be lowered to reduce damage to the body and a passenger.

The above example illustrates the bumper reinforcement, and likewise, in other anti-collision components for automobiles, the longitudinal end is swaged, and the webs parallel in the collision load direction are compressed to be increased in wall thickness. In the door beam, the collision load direction is the automobile width direction, and in the roof reinforcement, the collision load direction is the automobile height direction. Other anti-collision components for automobiles are required to satisfy the above relation equations ($R_{CI} \geq (t_W - T_W)$, $R_I \geq (t_I - T_I)$). Thus, the door beam and the roof reinforcement increase the strength against bending deformation in collision. The above numerical values shown in the bumper reinforcement are applied to other anti-collision components for automobiles, as preferable values of the inside corner radius $R_{CI}$, fillet radius $R_I$, and outside corner radius $R_{CO}$.

In the bumper reinforcement (or other anti-collision components for automobiles), one end or both ends may be swaged. For example, in a country with a large number of accidents on roads without median strips, to reduce damage in collision with an oncoming automobile, the collision resistance performance is required to be particularly high only on a driver's seat side of the bumper reinforcement. In that case, one end of the bumper reinforcement can be swaged, and the other end thereof can be processed by other means. As other means, conventional methods, such as squeezing, oblique cutting-off, and the mounting of a different member on an obliquely cut portion, which are disclosed in JP H07-025296 A, JP 2006-151095 A, JP H09-58386 A, or JP H10-94844 A.

When both ends of the bumper reinforcement (or other anti-collision components for automobiles) are swaged, the web thickness on both the driver's seat side and the passenger side can be increased. Thus, even when a front collision with a small overlap amount or an oblique collision is caused on either the driver's seat side or the passenger side, the amount of intrusion of a collision article into the body can be reduced.

When both ends of the anti-collision component for automobiles are swaged, the method disclosed in JP 2004-25214 A can be preferably applied. In this method, one end of a hollow profile is swaged, then a division type mandrel is inserted from the one end into the hollow profile, and the other end is swaged.

Swaging is typically performed by cold working, but as the strength of a metal material is higher, a crack is likely to be caused at swaging. To prevent this, hot working is applicable, if necessary. In this case, for example, swaging is performed immediately after the metal hollow profile as a raw material is heated, or by using the heated die and/or mandrel.

When a 6000- or 7000-series thermal treatment type aluminum alloy extrusion is used as the metal hollow profile, it is desirably swaged immediately after extruding, solution heating and quenching, or restoring. Immediately after extruding, solution heating and quenching, or restoring, the elongation percentage of the material is high, so that crack generation can be prevented at swaging.

Figure 5:
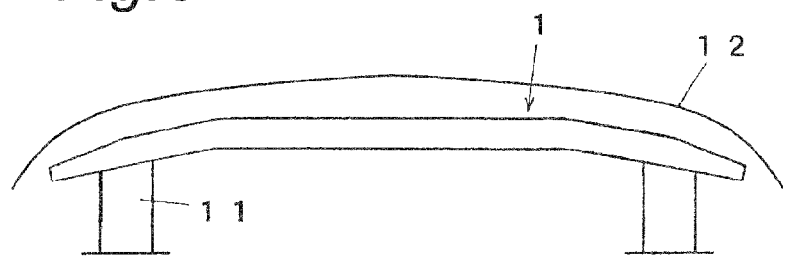
FIG. 5 is a plane view of a bumper structure including the bumper reinforce according to the present invention.

The anti-collision components for automobiles, such as the bumper reinforcement, can be bent according to the outer shape of an automobile. The aluminum alloy extrusion after bending is difficult to be swaged, and is thus bent without a core after swaging. FIG. 5 illustrates the bumper reinforcement 1 after bending. In FIG. 5, the numeral 11 denotes a bumper stay, and the numeral 12 denotes a bumper fascia (plastic outer cover). When the aluminum alloy extrusion is bent without a core, the flanges 6, 7 (see FIG. 2) are likely to be bent end to and to be wrinkled greatly. To improve this, in the aluminum alloy extrusion, the wall thickness of each of the flanges 6, 7 is preferably larger than the wall thickness of each of the webs 4, 5 and the intermediate web 8.

As part of a process for manufacturing the anti-collision components for automobiles, such as the bumper reinforcement, bending, drilling (working hole or bolt hole processing) or aging is performed, if necessary. When the 6000- or 7000-series thermal treatment type aluminum alloy extrusion is used as the raw material of the anti-collision components for automobiles, the manufacturing process is as follows. Restoring (thermal softening) can be performed, if necessary, before swaging. When drilling is performed by pressing, a core is necessary, so that drilling is required to be performed before swaging.

Extruding→drilling
 (pressing)→swaging→bending→age hardening     (1)

Extruding→swaging→bending→drilling→age hardening     (2)

In the description with reference to FIGS. 1 to 5, as the raw material (metal hollow profile) of the anti-collision component for automobiles, the aluminum alloy extrusion having the pair of webs 4, 5, the pair of flanges 6, 7, and the intermediate web 8 is used, but the aluminum alloy extrusion having other cross-sectional configurations can be used. FIGS. 6a to 6e illustrate other cross-sectional configurations. As illustrated in FIGS. 6(a) to 6(e), the aluminum alloy extrusion has two intermediate webs in a square profile (FIG. 6a), no intermediate webs (FIG. 6b), and projection flanges 13 (FIGS. 6c, 6d, and 6e).

As the aluminum alloy material, the 6000- or 7000-series aluminum alloy and other aluminum alloys can be used. In addition to such aluminum alloys, a high-tensile steel plate can be used. In the high-tensile steel plate, the hollow profile having a square cross section or a B-shaped cross section is formed by roll forming, thereby obtaining the raw material.

In the description with reference to FIGS. 1 to 5, by swaging, all the webs (the webs 4, 5, and the intermediate web 8) of the aluminum alloy extrusion are increased in wall thickness (or are shortened in length), but as illustrated in FIG. 7, the cross-sectional configuration can be changed so that a certain web is increased in wall thickness. In FIG. 7, only half of the cross section is swaged, and only a web 14a is increased in wall thickness, and is shortened in length.

In the description with reference to FIGS. 1 to 5, each of the webs 4, 5 is increased in wall thickness at swaging. At swaging, the web wall thickness increment ($t_W - T_W$) can be flowed to the outside of the initial profile to increase the outer shape dimension (flange width). FIG. 8 illustrates this, and a wide mounting face can be obtained on flanges 15a, 16a side.

EXAMPLES

To study the effect of the anti-collision component for automobiles according to the present invention, using the CAE (Computer Aided Engineering) analysis, deformation loads of the bumper reinforcements of the present invention example and the conventional example in front collision with a small overlap amount were calculated.

The metal hollow profile was made of the 7000-series aluminum extrusion, and had the cross-sectional configuration illustrated in FIG. 2. The metal hollow profile had an outer shape dimension of 40 mm×110 mm, body front-rear dimension L of 40 mm, and body heightwise dimension H of 110 mm. Wall thickness $T_W$ of each of the webs 4, 5 and wall thickness $T_I$ of the intermediate web 8 were 3.5 mm, wall thickness $T_{FF}$ of the collision side flange 6 was 4.0 mm, and wall thickness $T_{FR}$ of the automobile side flange 7 was 4.5 mm. Inside corner radius $R_{CI}$ of each of four corners formed by the webs 4, 5 and the flanges 6, 7 and fillet radius $R_I$ of each of four connecting portions of the intermediate web 8 and the flanges 6, 7 were 6 mm, and outside corner radius $R_{CO}$ of the corner was 1 mm.

A testing material of the bumper reinforcement according to the present invention example (testing material A) was made by actually swaging the end of the aluminum extrusion. Like the bumper reinforcement 1 illustrated in FIG. 1, body front-rear dimension 1 of the end (a range to a distant of 200 mm from the edge) of testing material A (see FIG. 3) was smaller toward the edge. Like the cross-sectional configuration illustrated in FIG. 3, wall thickness $t_W$ of each of the webs 4a, 5a and wall thickness $t_I$ of the intermediate web 8a were larger than initial wall thicknesses $T_W$, $T_I$, respectively, and were larger toward the edge. Inside corner radius $r_{CI}$ of each of corners formed by the webs 4, 5 and the flanges 6, 7 and fillet radius $r_I$ of each of connecting portions of the intermediate web 8 and the flanges 6, 7 were smaller than initial inside corner radius $R_{CI}$ and fillet radius $R_I$, respectively, and were smaller toward the edge.

Figure 9:
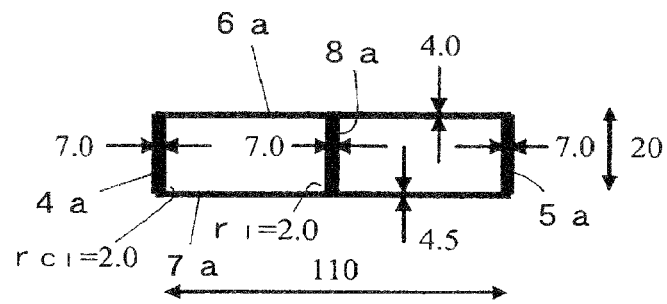
FIG. 9 is an end view of a testing material A (example of the present invention) used for CAE (Computer Aided Engineering) analysis

FIG. 9 illustrates the end face of testing material A after swaging (the portion in which body front-rear dimension 1 is reduced to the minimum). As illustrated in FIG. 9, body front-rear dimension 1 was 20 mm, and wall thickness $t_W$ of each of the webs 4a, 5a and wall thickness $t_I$ of the intermediate web 8a were 7.0 mm. Inside corner radius $r_{CI}$ of each of the four corners formed by the webs 4a, 5a and the flanges 6a, 7a and fillet radius $r_I$ of each of the four connecting portions of the intermediate web 8a and the flanges 6a, 7a were 2 mm.

A testing material of the bumper reinforcement according to the conventional example (testing material B) was made by squeezing the end of the aluminum extrusion (see JP H07-025296 A). Like testing material A, in testing material B, body front-rear dimension 1 of the end (a range to a distance of 200 mm from the edge) was reduced, and was smaller toward the edge.

Figure 10:
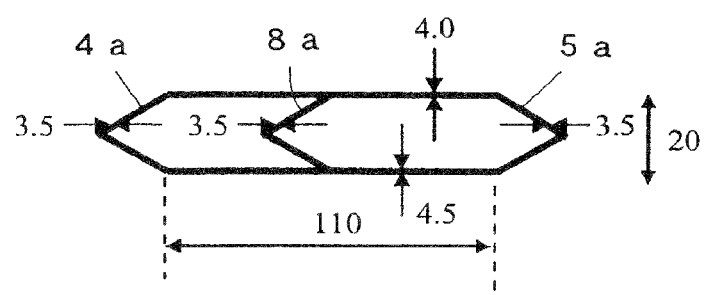
FIG. 10 is an end view of a testing material B (example of conventional art) used for CAE analysis.

FIG. 10 illustrates the end face in which the outer shape dimension thereof is reduced to the minimum. As illustrated in FIG. 10, body front-rear dimension 1 of the end face of testing material B was 20 mm, and the webs 4a, 5a were bending deformed to the outside of the cross section. The webs 4*a*, 5*a* and the intermediate web 8*a* were not changed in wall thickness before and after squeezing.

Testing materials A and B which have been described above were selected as the analyzing conditions of the CAE analysis.

Figure 11:
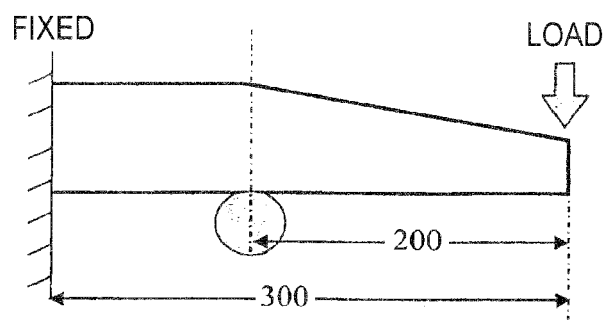
FIG. 11 is a diagram showing a CAE analysis model of front collision with a small overlap amount.
Figure 12:
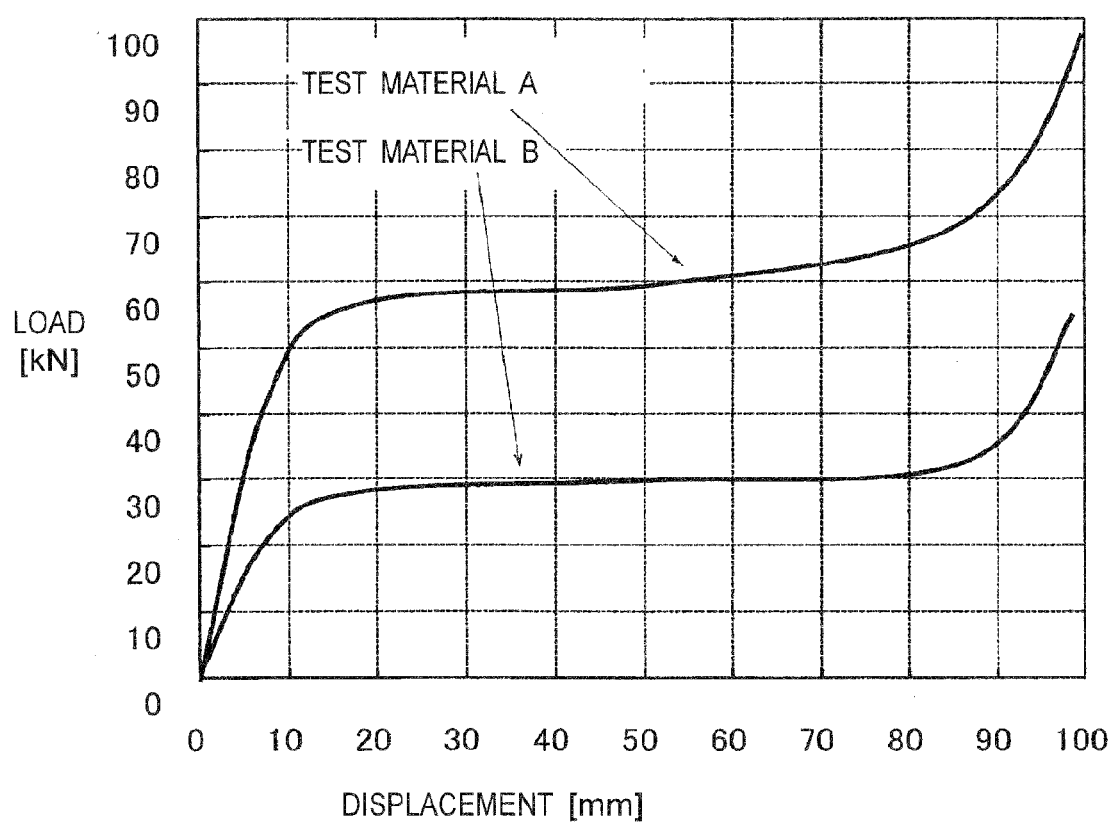
FIG. 12 is a load-displacement curve obtained by the CAE analysis.

As illustrated in FIG. 11, testing materials A and B were supposed as cantilever beams having a length of 300 mm. Assuming the outside wall of a crush box or a side member, calculated was a load-displacement relation when each testing material was constrained on the rear side at a position of 200 mm from the edge thereof to add a load from the front side. The load imitated front collision with a small overlap amount. As other analyzing conditions, each of testing materials A and B was made of the 7000-series aluminum alloy extrusion, and had mechanical characteristics of a bearing capacity of 310 MPa, a tensile strength of 365 MPa, and an elongation percentage of 14%. For the CAE analysis, the general-purpose static implicit method software ABAQUS was used. FIG. 12 illustrates obtained load-displacement curves.

As illustrated in FIG. 12, testing material B corresponding to the bumper reinforcement of the conventional example had a deformation load of about 30 kN, and testing material A corresponding to the bumper reinforcement of the present invention example had a deformation load of about 60 kN which is about twice the deformation load of the conventional example of 30 kN. Testing material B whose end was squeezed was reduced in deformation load because the webs were bent. Testing material A whose end was swaged was increased in strength and in deformation load because the webs were increased in wall thickness.

What is claimed is:

1. An anti-collision component having a unibody construction comprising:
    a collision side flange;
    a body side flange;
    a web connected to the flanges; and
    a longitudinal end at which a cross-sectional configuration is deformed,
    wherein the following relation is established:

$$t_W > T_W$$

where $t_W$ is a wall thickness of the web at the end, and $T_W$ is a wall thickness of the web at a portion where the cross-sectional configuration is not deformed, and
    wherein the following relation is established:

$$R_{CI} \geq (t_W - T_W)$$

where $R_{CI}$ is an inside corner radius of a corner formed by the web and each flange at the portion where the cross-sectional configuration is not deformed.

2. The anti-collision component according to claim 1, wherein the web includes a pair of webs parallel to each other and connected to the flanges.

3. The anti-collision component according to claim 2, wherein the web further includes an intermediate web parallel to the pair of webs in the cross section thereof, and
    wherein the following relation is established:

$$R_I \geq (t_I - T_I)$$

where $t_I$ is a wall thickness of the intermediate web at the end, $T_I$ is a wall thickness of the intermediate web at the portion where the cross-sectional configuration is not deformed, and $R_I$ is a fillet radius of each of connecting portions of the intermediate web and each flange at the portion where the cross-sectional configuration is not deformed.

4. The anti-collision component according to claim 1, wherein the anti-collision component is an aluminum alloy extrusion.

5. The anti-collision component according to claim 1, wherein the anti-collision component is made by roll forming of a steel plate.

* * * * *